(12) United States Patent
Creamer et al.

(10) Patent No.: US 6,519,228 B1
(45) Date of Patent: Feb. 11, 2003

(54) SYSTEM AND METHOD OF OPERATION FOR VERIFYING AND VALIDATING PUBLIC SWITCH TELEPHONE NETWORKS (PSTN) TO (IP) NETWORK SERVICES

(75) Inventors: Thomas E. Creamer, Boca Raton, FL (US); Peeyush Jaiswal, Boca Raton, FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/468,929

(22) Filed: Dec. 22, 1999

(51) Int. Cl.[7] .................. H04L 12/26; H04L 12/50; H04J 1/16; H04J 3/14; H04M 1/24; H04M 3/68
(52) U.S. Cl. .................. 370/241; 370/252; 370/352; 370/385; 379/207; 379/230; 379/13; 379/15
(58) Field of Search .................. 370/241, 231, 370/232, 235, 249, 252, 470, 526, 352, 353, 355; 379/10, 13, 15, 207, 230, 220, 219, 229

(56) References Cited

U.S. PATENT DOCUMENTS

| | | | |
|---|---|---|---|
| 5,566,161 A | | 10/1996 | Hartmann et al. |
| 5,805,587 A | * | 9/1998 | Norris et al. ............ 370/352 |
| 5,838,919 A | | 11/1998 | Schwaller et al. |
| 5,881,237 A | | 3/1999 | Schwaller et al. |
| 5,937,165 A | | 8/1999 | Schwaller et al. |
| 6,016,334 A | * | 1/2000 | Kasrai ............ 379/15 |
| 6,128,379 A | * | 10/2000 | Smyk ............ 379/230 |
| 6,141,339 A | * | 10/2000 | Kaplan et al. ............ 370/352 |
| 6,208,642 B1 | * | 3/2001 | Balachandran et al. ...... 370/385 |
| 6,240,174 B1 | * | 5/2001 | Silver ............ 379/230 |
| 6,269,330 B1 | * | 7/2001 | Cidon et al. ............ 704/43 |
| 6,272,208 B1 | * | 8/2001 | Kasrai ............ 379/15 |
| 6,282,281 B1 | * | 8/2001 | Low ............ 379/230 |

* cited by examiner

*Primary Examiner*—Huy D. Vu
*Assistant Examiner*—M. Phan
(74) *Attorney, Agent, or Firm*—Joseph C. Redmond, Jr.; Morgan & Finnegan, LLP

(57) ABSTRACT

A system verifies and validates PSTN to IP Network services prior to the availability of the services to a plurality of subscribers. A PSTN call generator services a plurality of callers coupled to the PSTN and to a test database. An IP client simulator is coupled to the test database and to an IP Network. A data bus couples the PSTN and the IP Network to a registration server for registering the client and a heartbeat server for tracking the system for heartbeat message. An application server processes test service calls from the PSTN call generator whereby PSTN-IP Network services can be executed for all clients or individual clients as represented by the IP Client simulator for verification and validation of PSTN services to IP Network clients prior to the availability of the services to the clients.

22 Claims, 7 Drawing Sheets

Test Script 3000

```
/****************************************
/*This test will generate a large
/*number of calls to registered
/*and unregistered subscribers
/*(subscribers=8999).
/*Execute from the
/*PSTN.Call.Generator.
/*Test input data:
/****************************************
Execute Test.Script.1000;
start.test;
firstphone=954-555-0000;
lastphone=954-555-8999;
action=bulkload;
call.flag=1; /*constant load*/
string=<tester id>;
circuitID=all;
resp.time=wait;
wait.time=1200; /*seconds*/
end.test;
```

Test Script 2000

```
/****************************************
/*This test will generate a large
/*number of calls to
/*unregistered subscribers
/*(subscribers=999).
/*Execute from the
/*PSTN.Call.Generator.
/*Test input data:
/****************************************
start.test;
firstphone=954-555-0000;
lastphone=954-555-0999;
action=bulkload;
call.flag=1; /*constant load*/
string=<tester id>;
circuitID=all;
resp.time=wait;
wait.time=1200; /*seconds*/
end.test;
```

Figure 5B

Test Script 4000

```
/*******************************
/*This test will generate load
/*for fault insertion testing.
/*(subscribers=8999).
/*Execute faults from the
/*System component.
/*Test input data:
/*******************************
Execute Test.Script.3000;
start.test; /*1 example fault*/
Reg.Server1=poweroff;
wait.time=120; /*seconds*/
Reg.Server1=unknown;
Reg.Server2=active;
wait.time=120; /*seconds*/
Reg.Server1=poweron;
wait.time=300; /*seconds*/
Reg.Server1=standby;
Reg.Server2=active;
end.test;
```

Test Script 5000

```
/*******************************
/*This test is for ICW client
/*usability testing under load.
/*(subscribers=8999+1).
/*Test input data:
/*******************************
Execute Test.Script.3000;
start.test; /*1 example test*/
Subscriber.PC=poweron;
wait.time=300; /*seconds*/
ICW.client=install;
parms=autoload;
wait.event=installcomplete;
Subscriber.PC=poweroff;
wait.time=300; /*seconds*/
SubscriberPC=poweron;
ICW.client=autoload;
wait.time=10; /*seconds*/
check=Reg.Server;
value.reg=active;
end.test;
```

Figure 5C ated Oct. 15, 1996, discloses an improved network interface unit for remotely monitoring and testing the performance of DS1 telephone circuits, installed on the network side of an interface between customer premises equipment and equipment provided by the network provider. The interface non-intrusively collects and transmits full-time performance monitoring data to the network provider. Thus, the network providers are alerted to potential problems before they adversely affect the service provided by the network provider to customers. The service provider can quickly and non-intrusively determine whether a problem exists in equipment provided by the network provider or in the equipment on the customer's premises.# SYSTEM AND METHOD OF OPERATION FOR VERIFYING AND VALIDATING PUBLIC SWITCH TELEPHONE NETWORKS (PSTN) TO (IP) NETWORK SERVICES

BACKGROUND OF THE INVENTION

1. Field of Invention

This invention relates to network services testing systems and methods of operation. More particularly, the invention relates to systems and methods for verifying and validating PSTN-to-IP network services.

2. Description of Prior Art

The introduction of services, e.g., call waiting, call forwarding, call back, etc., which support PSTN-to-IP network communications are simple to test when the testing involves single telephone calls and a few IP network clients, e.g., PC's. For PSTN or IP network service providers testing new services before availability it is necessary to verify and validate these new services before on-line operations commence. The verification and validity involves generating hundreds of telephone calls per second and simulating thousands of IP network clients. What is needed to verify and validate a service is to simulate PSTN-to-IP service subscribers and PSTN calls to such subscribers; provide distinct client actions to PSTN services; perform PSTN-to-IP service loading in a client behavioral scheme which supports predictable expected test results from an IP interface.

Prior art related to network service testing include the following:

U.S. Pat. No. 5,566,161 of Hartmann et al., issued Oct. 15, 1996, discloses an improved network interface unit for remotely monitoring and testing the performance of DS1 telephone circuits, installed on the network side of an interface between customer premises equipment and equipment provided by the network provider. The interface non-intrusively collects and transmits full-time performance monitoring data to the network provider. Thus, the network providers are alerted to potential problems before they adversely affect the service provided by the network provider to customers. The service provider can quickly and non-intrusively determine whether a problem exists in equipment provided by the network provider or in the equipment on the customer's premises.

U.S. Pat. No. 5,838,919 to Schwaller et al., issued Nov. 17, 1998, discloses testing a communications network performance utilizing a test scenario simulating actual communication traffic on the network. The test scenario includes an endpoint node specific test protocol between an endpoint node pair including a first and associated second endpoint node on the network to be tested. A partner endpoint node test protocol is determined from the endpoint node specific test protocol and communicated to/from the first endpoint node to the associated second endpoint node. A plurality of endpoint node pairs execute different endpoint node specification test protocols under a test scenario. A console is provided for establishing the test scenario and assigning the test scenario to endpoint node pairs and then initiating execution of the test scenario. Performance data may be monitored at one of the endpoint nodes of each endpoint node pair and reported to the console either as it is generated or after completion of the test.

U.S. Pat. No. 5,881,237 of Schwaller et al., issued Mar. 9, 1999, discloses testing communications network performance utilizing a test scenario simulating actual communication traffic on the network. A console is provided on the network for establishing the test scenario and assigning the test scenario to endpoints on the network to be tested. Execution of a test protocol by the endpoint nodes is initiated by the console. Performance data such as throughput, transaction rate, and response time may be monitored at selected ones of the endpoint nodes and reported to the console either as it is generated or after completion of the test. Multiple network protocols may be utilized in a single test scenario. Each endpoint node includes an associated script representing a type of application traffic such as credit checks, or a database update. Endpoint nodes execute tests as applications level programs on existing endpoint nodes on the network to be tested allowing testing of networks using actual protocol stacks independent of the application programs available on existing endpoint nodes.

U.S. Pat. No. 5,937,165 to Schwaller et al., issued Aug. 10, 1999, discloses testing communication network performance utilizing test scenarios determined on the type of application traffic expected on the network to be tested. A console provided on the network establishes the test scenario and assigns the test scenario to endpoint nodes on the network to be tested. Execution of the protocols by the endpoint nodes is initiated by the console. The test scenario may be terminated when all endpoint nodes specific test protocols have completed execution or when any one endpoint completes execution of its test protocol.

None of the prior art discloses a system and method for verifying and validating PSTN-to-IP network services by simulating "thousands of callers" and "thousands of subscribers" to generate load across the PSTN and IP networks prior to the availability of such services to such subscribers and callers.

SUMMARY OF THE INVENTION

An object of the invention is a system and method for verifying and validating network services prior to availability of such services to network subscribers and clients.

Another object is simulating PSTN-to-IP service subscribers and PSTN calls to such service subscribers in the system and methods for operation for verifying and validating network services.

Another object is performing load testing of network services to support validation and verification of PSTN-to-IP service prior to availability of such in a network.

These and other objects, features and advantages are achieved in a system and method of operation which includes a PSTN call generator for PSTN-to-IP network services, e.g., Interconnect Call Waiting (ICW), coupled to a test database and linked to an Service Control Point (SCP) in an Advanced Intelligent Network (AIN). The SCP is linked through the PSTN using Signaling System 7 to a Service Switching Point (SSP) and is coupled to an IP network. A Client Test Station (CTS) is coupled to the SSP through a dial-up line. An IP Client Simulator is coupled to the test data and through a TCP/IP bus to a security firewall in the IP network. A subscriber Registration Service; Client Heartbeat Server and an Application Server are coupled to a TCP/IP bus through the security firewall. An Element Management System (EMS) server and console for system operation, administration, maintenance and provisioning (OAM&P) are coupled to the IP network and a router serving the TCP/IP bus and the AIN. A Service Management System (SMS) is integrated with the Registration Server, SSP switch and the SCP in the AIN. After integration of the system components and provisioning, service test subscriber data in the Registration Server, the switch (SSP) and the SCP, test subscriber phone numbers are used to create automated test cases for load and performance testing. From the Client Simulator or test station, an Integration Verification Test (IVT) and Service Verification Test (SVT) are performed for PSTN-to-IP network services using a representative service, e.g., Internet Call Waiting (ICW). Load tests are performed by having the IP Client Simulator perform a mass registration of the test subscribers. Once completed, the PSTN Call Generator will begin the service load testing by generating calls to the SSP which sends Termination Attempt Trigger (TAT) messages for large sets of test subscribers within short intervals of time to the SCP. By applying the intervals based on service timers and timeouts, a sustained load can be maintained over long periods of time. Performance testing is based on specific measurements against the SCP; firewall; registration server; heartbeat server; and application server. A usability test for the system determines how communications between a client and a service behave under load. A Fault Insertion Test covers service behavior during the simulation of system components and communication outages during service load conditions. Following the system tests for load, performance, etc., various service test cases are performed for the system as a whole and clients as individuals.

DESCRIPTION OF DRAWING

The invention will be further understood from the following detailed description of a preferred embodiment taken in conjunction with appended drawings, in which:

FIG. 5B is a flow diagram for a load test of test Scripts 2000 and 3000 for load registration by the client Simulator of FIG. 3; and FIG. 5C is a flow diagram for a load test of test Scripts 4000 and 5000 for fault insertion test and usability test by the client Simulator of FIG. 3.

DETAILED DESCRIPTION OF A PREFERRED EMBODIMENT

Within the process of developing a new service for a communications system, for example, a Public Switch Telephone Network (PSTN)-Internet Protocol (IP) interconnection, there is a need for a developer to simulate and verify the service and obtain client behavior definition in the system before introduction of the service. The test system is spread across many components and the system is tested as if the service was active. The test results enable the system developers to modify the communication system to provide the service with some assurance of acceptable performance. In the present instance, the test system will be described with respect to an Internet Call Waiting (ICW) service. However, it should be understood that other services, e.g., Call Waiting, Call Forwarding, Call Back, Call Conferencing, Caller ID, etc., can be similarly tested and verified for introduction into the communications system.

Figure 1:
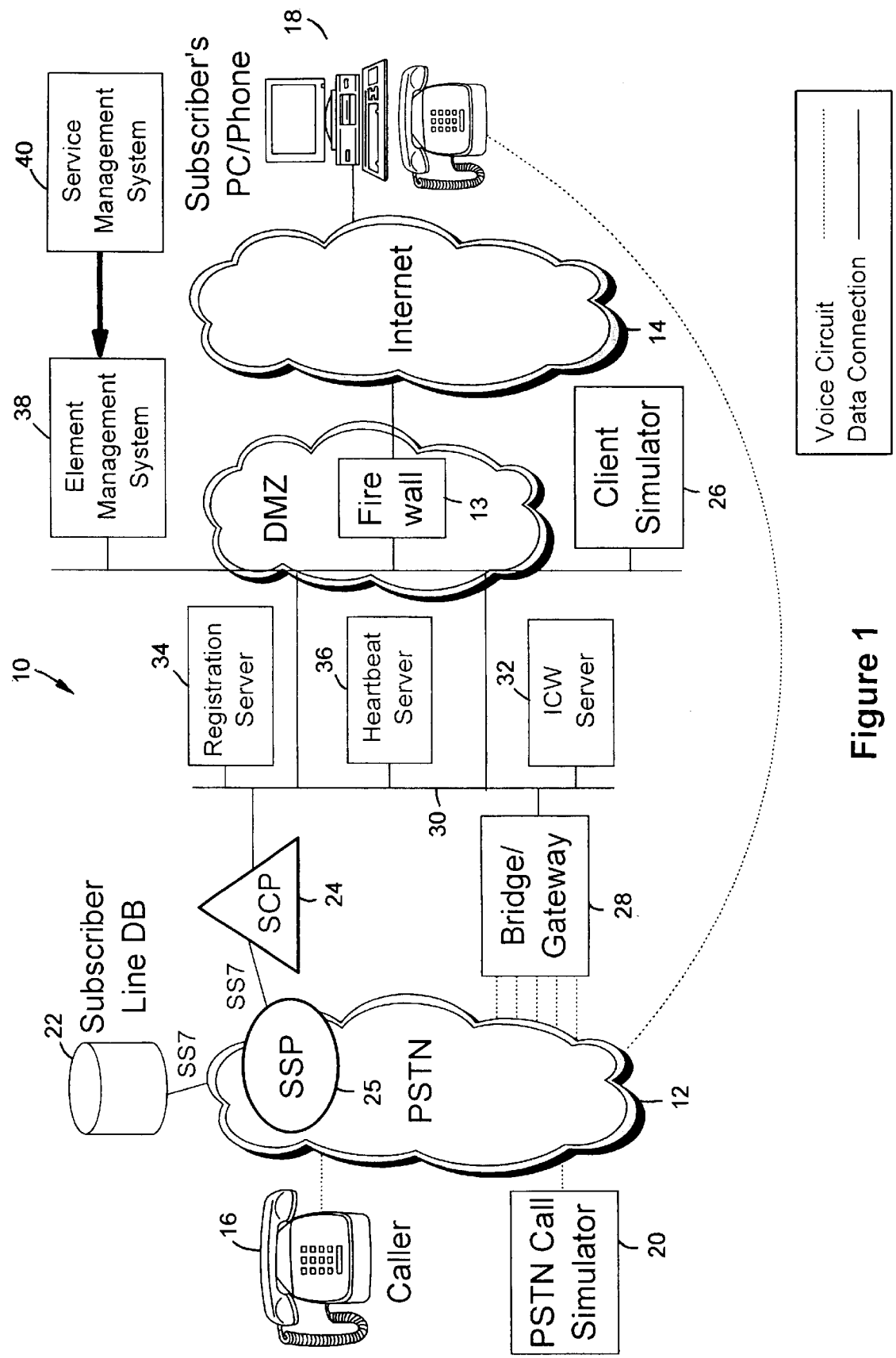
FIG. 1 is a block diagram of a PSTN-to-IP test system incorporating the principles of the present invention.

In FIG. 1, a PSTN-to-IP test system 10 is shown and includes a telephone system 12 and a communication network 14, e.g., the Internet, adapted to simulate service application between a caller 16 coupled to the network 12 and a client 18 coupled to the Internet 14 by a voice circuit. The client 18 is also connected to the network 12 by a voice circuit. The network 12 is voiced circuit based and supports a Signaling System 7 (SS7) that is coupled to a PSTN Call Simulator 20; a subscriber line database 22; and a System Control Point (SCP) 24. The call simulator 20 is responsible for:

1. Generating call load to a Client Simulator 26 (to be described hereinafter);
2. Understanding call flow state models including call start up and call termination scenarios such as:
   (i) Call Forwarding;
   (ii) Call Acceptance (over PSTN and/or IP networks);
   (iii) Generic Announcements ("I'll Call Back");
3. Generate test case data output from post-test processing;
4. Accepting load generated by the simulator 26.

The subscriber line database 22 contains telephone numbers and subscriber information for generating call details between the caller 16 and the subscriber PC/Phone 18. A bridge/gateway 28 serves as an interconnection between the network 12 and the network 14 as will be further described hereinafter.

A TCP/IP bus 30 links the SCP 24; bridge/gateway 28; and the simulator 26 through a firewall 13 to the Internet 14. The bus 30 provides a data connection between the networks 12 and 14. An application server 32 is coupled to the bus 30 and provides different types of service for calls placed between the caller 16 and subscriber 18. As indicated before the application server may be used for other service testing, e.g. Call Waiting, Call Forwarding, Call Back, Call Conferencing, Caller ID, etc. For purposes of the present description the server 32 will be referred to as an Internet Call Waiting (ICW) server. The ICW server is where multiple instances of an Internet Call Waiting (ICW) application, one per incoming call to the subscriber(s) are executed. The ICW application is responsible for taking details of the incoming call and translating the call into the correct format for the client's software to process. The ICW application is also responsible for the detection of timeout conditions that may exist when the subscriber has not responded to an incoming call. Once the subscriber has responded, the ICW application then translates the response back into a format that the Service Control Point (SCP) 24 can process.

A Registration Server 34 coupled to the bus 30 and records the ICW client receiving the service. The role of the server 34 is to maintain the current state of the subscriber's usage of the service. More specifically, the server 34 provides the Telco Service Provider (not shown) for the PSTN 12 with the ability to offer subscribers PSTN-IP services which are based on the state of the subscriber's usage of the service. While a customer subscribes to a service, such as ICW, the customer's usage of that service is transient in nature. When the subscriber logs onto the Internet, the ICW client software registers with the server 34 based on options set by the subscriber at installation time. These options allow manual or automatic registration at startup of the subscriber's PC. As calls arrive at a Service Switching Point (SSP) 25 in the PSFN, the SSP sends a Termination Attempt Trigger (TAT) to the Service Control Point (SCP) 24. The SCP 24 then sends a Query Request (QR) message to the server 34. The server 34 returns the current state of the subscriber as active or inactive for the ICW service.

A Heartbeat Server 36 coupled to the bus 30 is made aware of the subscriber's registration by the server 34. From that point on, the server 36 awaits the transmission of the heart beat message from the subscriber's client software. As heartbeats arrive from the subscriber's client software, the server 36 keeps track of the status of the subscriber through heartbeat interval and the number of "missed " heartbeats. This method is used in case the subscriber's PC has been shutdown, powered off or has experienced a power outage before the client's software has had a chance to send a de-registration message to the Registration Server 34. The heartbeat interval and the number of permissible "missed" heartbeats are configured by the Telco Service Provider at the installation time and may be changed during ongoing operation of the service.

The Client Simulator 26 accepts the call load generated by the simulator 20 and provides a load to the simulator 20. The simulator is also programmed to a service state model as the model relates to subscriber options and actions. The simulator 26 is a part of the PSTN-IP service test system that provides the ability to simulate thousands of clients during testing. The behavior of the simulated clients is based on predetermined telephone number ranges. For example, all telephone numbers in the range of 954-555-000 through 954-555-1000 will always be "active" and always "accept the call". By using this pre-determined behavior, the test results are easy to verify. Verification during integration test with single calls and during system load test with many thousands of calls are predictable. Any deviations from this pre-determined behavior are flagged by the PSTN simulator 20 and the Client Simulator 26 into test data output log files.

An Element Management System (EMS) 38 is coupled to the bus 30 which provides subscriber data from the database 22 to the SCP 24, and Registration Server 34. The EMS serves the Telco Service Provider's Operations, Administration, Maintenance & Provisioning (OAM&P) requirements. For OAM&P, the EMS provides graphical status indication of the various PSTN-IP components, such as the Registration Server, Heartbeat Server and Application Server. In addition to status, the EMS provides an alarm application, which is used by operation and maintenance personnel for the PSTN-IP system within the production environment.

The Service Management System (SMS) 40 is linked to the EMS 38, the SCP 24 and the SSP 25. The SMS is used by the Telco Service Providers Customer Service personnel (not shown) and is the repository and transaction system for customer service subscriptions. Once a customer has subscribed to a particular application service, such as ICW, the SMS is responsible for the provisioning of the service subscription to the various PSTN and IP network platforms within the Telco's Service provider's domain. In the case of ICW service, the SMS 40 provisions the SSP 25 switches, the SCP 24 and the Registration Server 34. The interface to the Registration server is via the EMS. The EMS is then responsible for provisioning the appropriate Registration Server(s). By using this method, the EMS provides a single interface to the SMS for multiple Registration Servers, which decreases the complexity of the SMS communication interface and routing tables.

The test system 10 provides the following functions with respect to ICW service verification:
1. Simulating calls to the System Switching Point (SSP) 24 in the network 12 using the call generator 20.
2. Simulating an ICW client using the simulator 26.
3. Automating the ICW service using actual ICW service components.
4. Testing all ICW client return codes through the SCP and a Service Switching Point (SSP) 25 to the simulator 20.
5. Applying a load on the system representative of the ICW service.

The ICW service verification starts with system component integration using the following process which will be described in conjunction with FIG. 1:

As a first step in component integration, the simulator 26 is integrated with the Registration Server 34. The following are verified:
1. Information Services Platform (ISP) dial-up connection through the Internet to the firewall.
2. An ICW Client Registration message is encrypted for the simulator 26, then decrypted by the Registration Server.
3. The ICW Client is registered in the Registration Server and marked "active".

A second step integrates the Call Generator 20 with the Service Control Point 24. The following are verified:
1. A connection between the Call Generator and the SCP.
2. Call generation of a call to an SSP.
3. An SSP Termination Attempt Trigger (TAT) message is sent to the SCP.
4. The SCP 24 receives a TAT message and starts an ICW Service Processing Record.

In step 3, the SCP is integrated with the Registration Server. The following are verified:
1. A connection and communication between the SCP and the Registration Server.
2. The SCP generates a Query Request Message which is sent to the Registration Server.
3. The Registration Server returns a Query Response Message to the SCP with status equal to "Active".

In step 4, the SCP is integrated with the Call Generator 20. The following are verified:
1. The ICW Service Processing Logic on the SCP processes the Query Response Message from the Registration Server.
2. The SCP generates a "SendToResource" (STR) play announcement to the SSP.
3. The SSP plays the announcement and the simulator 20 uses speech recognition to understand which announcement has been played.

In step 5, the SCP is integrated with the ICW Server 32. The following are verified:
1. A connection and communication between the SCP and the ICW Server.
2. The SCP generates an Invoke Application Request (IAR) message which is sent to the server 32.
3. The server 32 accepts the Invoke Application Request message and starts an ICW application.

In step 6, the server 32 is integrated with the Client Simulator 26 and the following are verified:
1. The connection and communication between the ICW server 32 and the ICW Client Simulator 26 are verified.

2. An ICW application generates an encrypted ICW Client Message which is sent to the Client Simulator 26 and decoded.

3. The Client Simulator processes the client message and the message contents are verified.

In step 7, the ICW Client Server is further integrated with the ICW Server. The following are verified:

1. A connection and communication between the ICW Server and the ICW Client Simulator are verified.

2. The Client Server 32 generates an encrypted ICW Client "Call Disposition" message which is sent to the ICW application and decoded.

3. The ICW application processes the ICW Client Call Disposition message and the message contents are verified.

In step 8, the ICW Server is integrated with the SCP. The following are verified:

1. The ICW Server generates an Invoked Application Response message which is sent to the SCP.

2. The SCP accepts the Invoked Application Response message.

In step 9, the SCP is integrated with the Call Simulator 20. The following are verified:

1. The ICW Service Processing Logic on the SCP processes the Invoked Application Response message from the ICW Server 32.

2. The SCP generates an Authorized Termination message to the SSP.

In step 10, the ICW Simulator is integrated with the Heartbeat Server. The following are verified:

1. A connection and communication between the Simulator 20 and the Heartbeat Server 36.

2. The Simulator encrypts and sends a Heartbeat message to the Server 36 where the message is decrypted.

3. The Heartbeat Server 36 processes the Heartbeat message and the results are verified.

In step 11, a regression bucket of test cases is executed from steps 1–10 to verify that communication between the test system components have not changed during the execution of steps 1–10.

In step 12, the EMS 38 is integrated with the Server 32. The following are verified:

1. A connection and communication between the EMS and the Servers 32, 34, and 36.

2. Status information displays on the EMS are verified.

In step 13 the System Management System (SMS) is integrated with the EMS provisioning interface and the Registration Server. The following are verified:

1. A connection and communication between the SMS and EMS provisioning interface.

2. A connection and communication between the EMS provisioning interface and the Registration Server (database).

3. SMS provisioning flow through the EMS provisioning interface and the Registration Server.

4. Load the ICW test subscriber data on the Registration Server.

In step 14, the SMS is integrated with the SCP and the SSP. The following are verified:

1. The connection and communication between the SMS and SCP provisioning interface are verified.

2. The SMS provision flow through to the SCP (database) is verified.

3. The ICW test subscriber data is loaded on the SCP.

4. The connection and communication between the SMS and the SSP provisioning interface are verified.

5. The SMS provisioning flow through to the SSP (data tables) is verified.

After completion of system component integration described in steps 1–14, an ICW system verification test is performed for registration load; call load; fault insertion and usability which will be described in conjunction with FIGS. 2–5.

Figure 2:
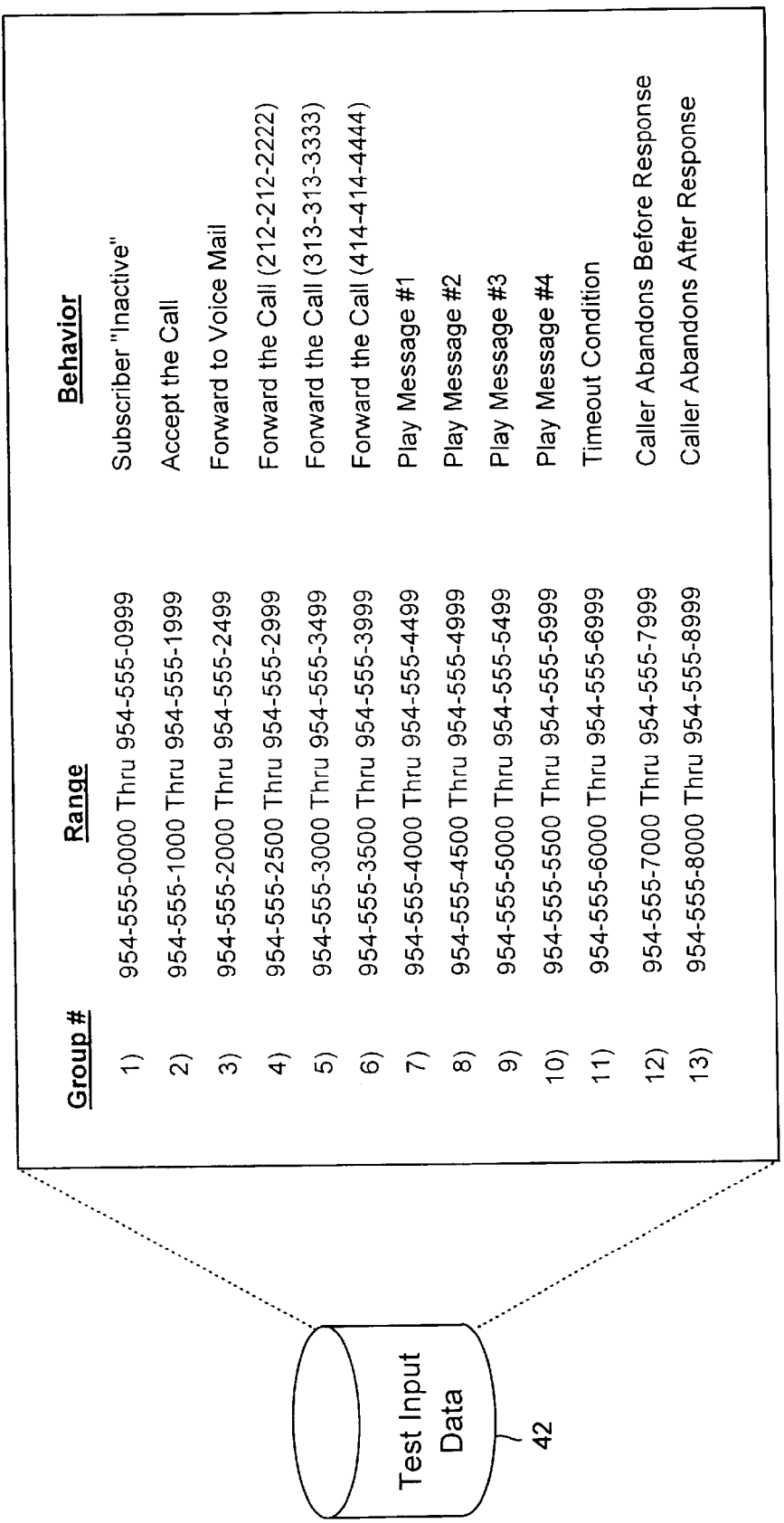
FIG. 2 is a representation of a telephone number scheme for verifying network service under test, e.g. Internet Call Waiting service in the test system of FIG. 1.

Turning to FIG. 2, in order to make post-test results easier to identify, groups of Telephone Numbers (TNs) are stored by group number in a test input database 42 and identified in ranges with each range having a specific behavior. Thus each range group will have the same test results. For example in group 1, TNs in the range of 954-555-0000 through 954-55-0999 will always have a result of "Subscriber—Inactive". Therefore, all test results in this TN range will have the same test data output as it relates to load or performance testing. In group 2, the TN group 945-555-1000-1999 will have a test result for "accept call". The other range groups have other test results as indicated. To interpret the post-test data output, simple utilities can be used to gather subsets of the data output for post-test verification. Post-test verification can be supported using this method without excessive loss of test time.

Figure 3:
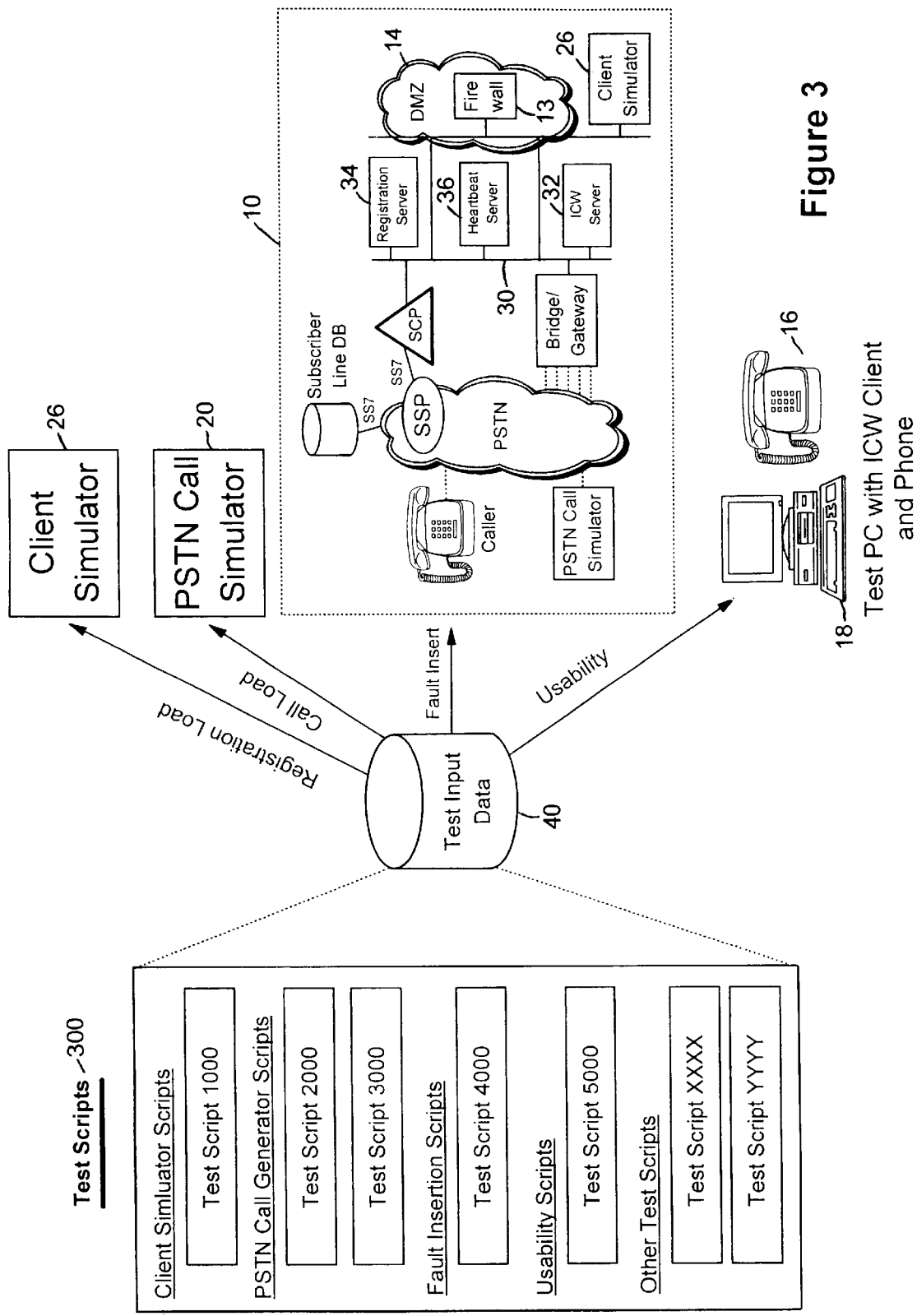
FIG. 3 is a listing of test scripts for the Client Simulator; PSTN Call Simulator; Client Station of the test system of FIG. 1 for mass registration; registration service load; ICW service load; fault insertion and usability

Briefly before describing the operation of the test system, FIGS. 3 provides an over view of the test system, as follows: A load test on the system 10 is performed by first having the Simulator 26 perform a "mass registration" of the test subscribers listed in the Registration Server 34. Once completed, the Call Simulator 20 begins the ICW Service test loading by sending calls for large sets of the test subscribers within short intervals of time (for example: 1000 test subscribers every 30 seconds). The system is next operated with PSTN Call simulator and the client simulator applying load to the SSP, SCP and the Registration Server. By applying intervals, based on ICW service timers and timeout values, a sustained load can be maintained over a long period of time and system performance evaluated under load.

A Fault Insertion Test (FIT) covers the ICW component and communication outages. A service verification plan documents the various Fault Insertion scenarios. The following areas are covered both with and without load:

1. Loss and recovery of communications between:
   (i) SCP and ICW servers;
   (ii) ICW Servers and ICW Client Simulator (plus ICW Clients on PCs);
   (iii) ICW Servers and EMS.
   (iv) EMS Provisioning Interface and the SMS;

2. Loss and recovery of an ICW component:
   (i) SSP;
   (ii) SCP;
   (iii) ICW Servers;
   (iv) EMS;
   (v) Routers/Firewall;
   (vi) ICW Client Simulator (plus ICW Clients on PCs).

A Client Usability test covers several areas that concern the ICW subscribers. These areas of the client would be covered in the test:

1. Loading from a CD-ROM or a web server.

2. Client interfaces (messages, look and feel, and/or window overlays).

3. Performance during ICW load tests.

4. Performance on a heavily loaded (many applications) PC.

Now continuing in FIG. 3, test scripts 300 are shown for performing Internet Call Waiting verification and validations in the test system 10. The test scripts are provided to the test input database 40 linked to the client simulator 26; the PSTN call simulator 20; the test system 10; the caller phone 16; and the client station 18. The client simulator 20 runs a test script 1000 for loading the registration server in a mass registration for a range of telephones to determine if registrations occur. The call generator 20 runs a test script 2000 and a test script 3000. The test script 2000 generates a large number of calls to a group of unregistered subscribers by the call simulator 20, which places a load on the SSP; SCP; and registration server. The response for the group is measured with respect to the behavior listed for the group in FIG. 2. The test script 3000 run by the call generator 20 generates a large number of calls to both registered and unregistered subscribers and the performance for each group is measured with respect to the behavior listed in FIG. 2.

A fault insertion test script 4000 is a manual test to determine system performance for a particular fault and the response of the system to the fault. The test script 5000 is a manual test for the usability of the system by a client station for a fault condition which will be described in more detail in connection with FIG. 5.

Figure 4:
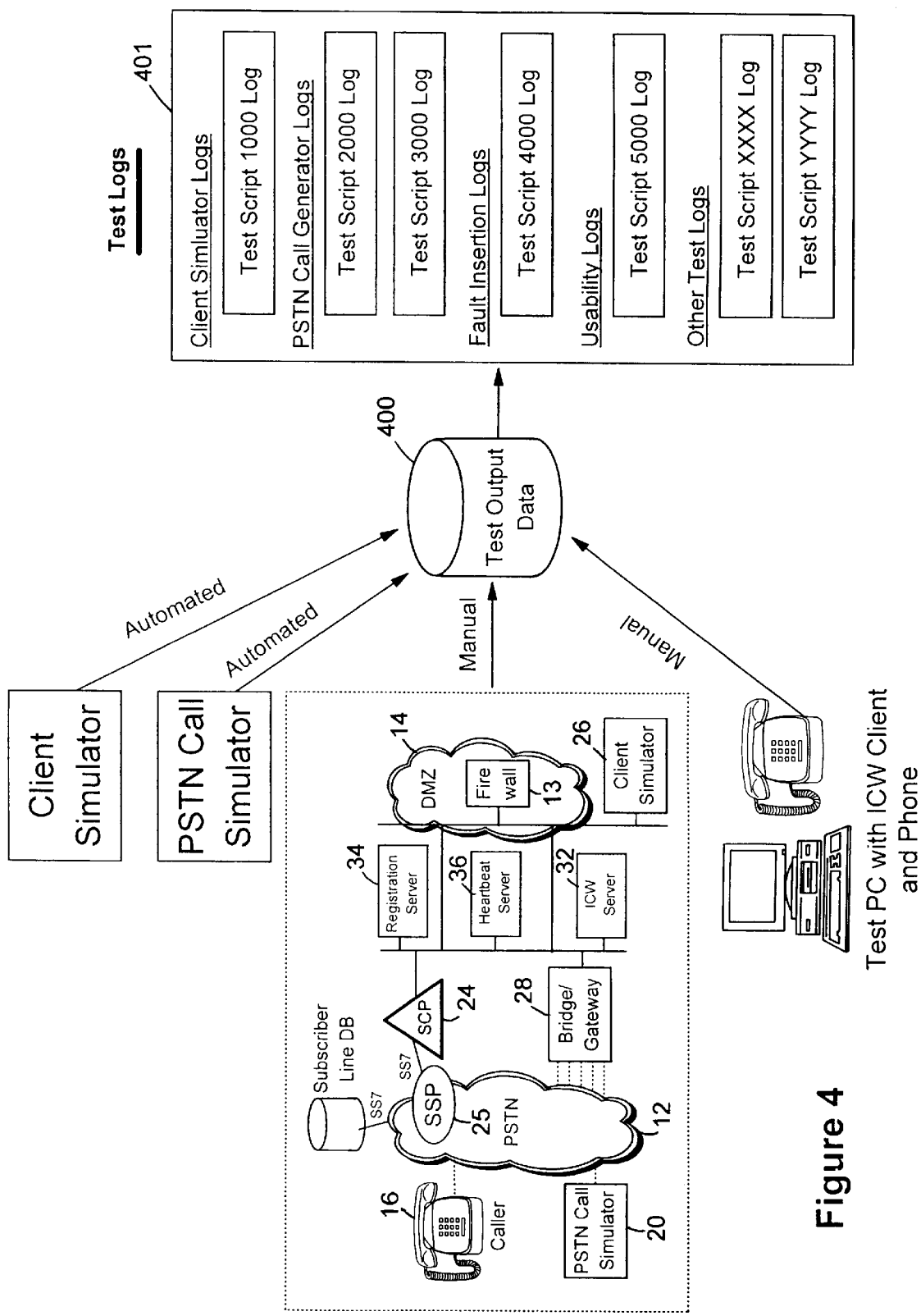
FIG. 4 is a representation of test logs maintained in the test system of FIG. 1 for the test scripts listed in FIG. 3.

In FIG. 4, the test data collected by the client simulator; PSTN call simulator; test system; and the caller station are provided to a test output database 400 and maintained in test logs 401 for the client simulator; call generator system and caller stations for analysis purposes in resolving any failures of the system under load for test scripts 1000–5000.

Figure 5A:
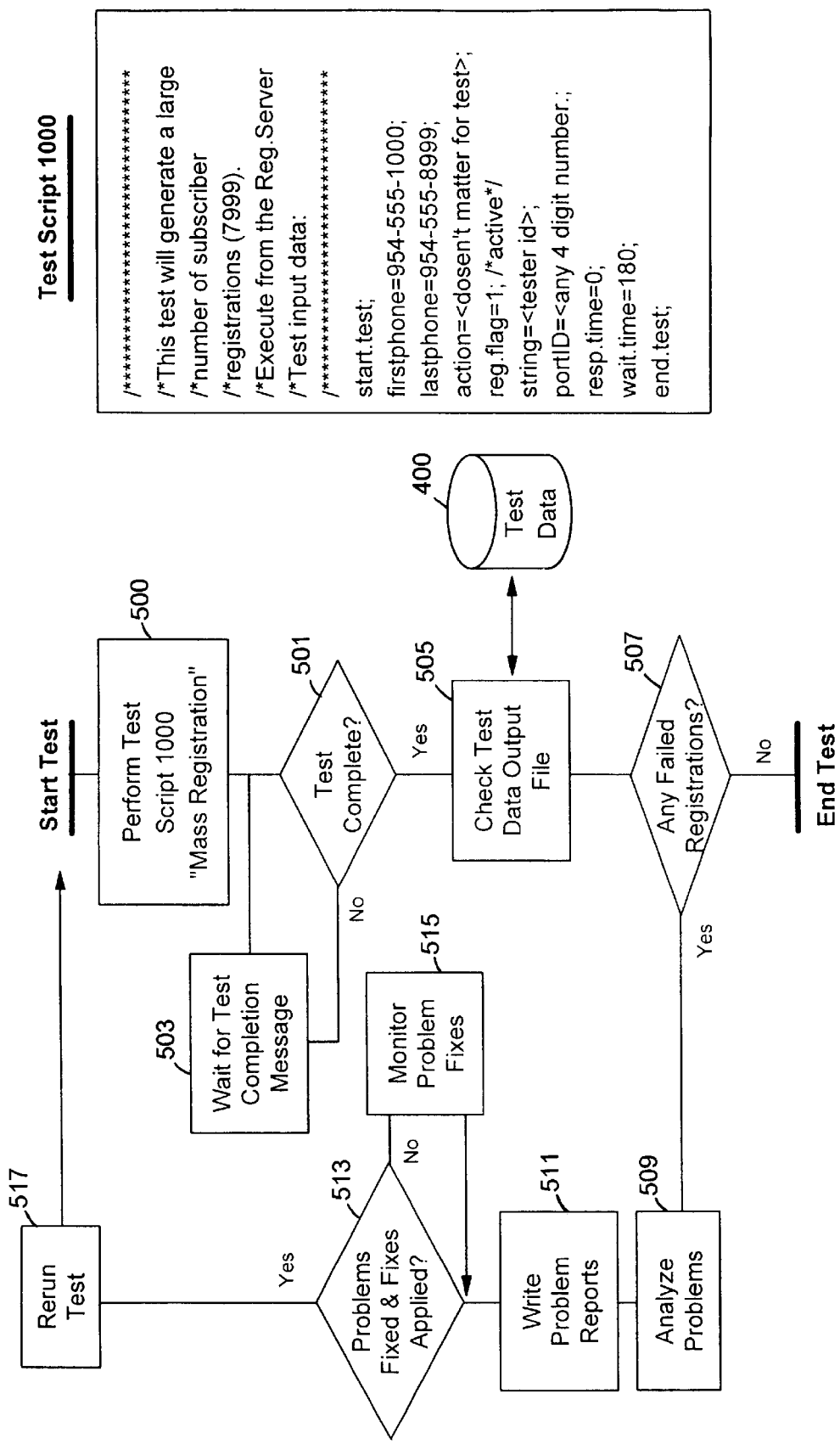
FIG. 5A is a flow diagram for a load test of test Script 1000 for client registration by the client Simulator of FIG. 3.

In FIGS. 5 A, B and C, the test scripts 1000–5000 for Load, Fault, and Usability Testing are shown. In FIG. 5A, the test script 1000 performs client registration. Telephone numbers are generated by the client simulator and provided as a load to the registration server to measure the effectiveness of the server in registering telephone numbers. In step 500, the test is performed for telephone numbers beginning with 954-555-1000 through 954-555-8999. Each telephone number is set to "active" and the telephone numbers are generated without creating any interval between them for the registration server to handle. A test 501 is performed to determine if all the numbers have been generated. A "no" condition initiates block 503 to wait for a test completion message. A "yes" condition for test 501 provides the results to an output file 505 which is provided to the test data output database 400. Data is examined in test 507 to determine if the registrations failed the test. A "no" condition ends the test. A "yes" condition initiates an analysis step 509 from which a report is written in step 511. Problem fixes are identified and applied in step 513. If the problem is not fixed, the problem is then monitored in step 515. If the problem is fixed, the test is re-run in step 517.

In FIG. 5B, the PSTN call generator in test script 2000 applies load to the registration server by way of the SSP and SCP. The test is run for unregistered subscribers in group 1 for range 954-555-0000 through 954-555-0999. FIG. 2 indicates this range of telephone numbers is to be inactive. FIG. 5A the test is run using the process 500 for the registration server in lieu of the client registration. The test 501 determines if the test is complete. A "no" condition continues the test in block 503 to await a completion message. Upon test completion, the test data is provided to an output data file in block 505 and stored in the test database 400. The test data is examined to determine whether or not there were any errors in the test data by an inactive phone number being registered by the registration server. The analysis and fix process is undertaken in the same manner as described in FIG. 5.

Continuing in FIG. 5B, the test script 3000 is run after completion of the test script 1000. The test determines the performance of the registration server with respect to calls generated by a call generator, the client simulator, and the PSTN call generator. The test is run using the process 500 but substituting ICW service in lieu of client registration. In the operation 500 the telephone numbers in groups 1–13 which are in the ranges 954-555-0000 through 954-555-8999 are activated. The test is checked for completion in test 501. The test data is provided to output data file 400. The data is checked against the registration server results and compared to the expected behavior for the telephone numbers indicated in FIG. 2. Any difference in behavior for a telephone number in a group is recorded as a failure in test 507. The problem is then analyzed and fixed as reported in the manner described for FIG. 5A.

In FIG. 5C, a manual fault is inserted into the test system 10 using test script 4000. The main types of failures can be installed in the test system. The present fault insertion test is run while test script 3000 is being executed and uses the test process 500 of FIG. 5A. The test assumes registration server 1 and registration 2 are operating in the system. In block 500, the registration server 1 is powered "off" for 120 seconds which places registration server 1 in an unknown state. Registration server 2 continues to be "active". After a time interval, for example, 120 seconds, registration server 1 is powered back "on" and checked after a time interval, for example, 300 seconds. After 300 seconds, registration 1 should assume an "active" standby state and registration server 2 continues as "active", after which the test is complete in step 501. The test data is provided to an output file in block 503 and the test data stored in the database 400. The test data is analyzed to determine whether or not registration server 1 returned to a "standby" state after power "off". If so, the test ends. If not, the failure is analyzed and a report written to fix the problem.

Continuing in FIG. 5C, a usability test is performed using test script 5000 and test process of FIG. 5A for the client station 18 to determine if the station operates correctly under a fault condition. In block 500, the PC client station is powered "on" and after 300 seconds, the ICW client software is installed for automatic load. After the client software is installed, the PC is powered "off" for 300 seconds, followed by the PC client station being powered "on". The test determines whether or not the ICW client software automatically "re-load" after 10 seconds. The registration server is checked to determine if the client station is indicated as "active" at the registration server. If so, the test ends; if not, the failure is analyzed, followed by a report to fix the problem as described in connection with FIG. 5A.

Summarizing, The simulator 26 is used to simulate many ICW clients over the Internet. The PSTN Call generator 20 is used to simulate a caller. Together, the PSTN Call Generator 20 and the ICW Client simulator 26 send messages to and receive messages from the ICW service. The process is automated and records the test results for review after the tests have been executed. By using an automated process, simulating single ICW clients and executing all of the various response options can be easily reproduced. Once the system has been completely tested, the focus of testing can be put on building up load. This "build up" of load can then start to show how the system behaves when simulated call traffic is placed on the system.

While the invention has been shown and described with respect to the preferred embodiment, various changes can be made therein without departing from the spirit and scope of the invention as defined in the appended claims, in which:

We claim:

1. A system for verification and validation of PSTN to Internet Protocol (IP) Network services to a plurality of subscribers, prior to the availability of the services, comprising:
   (a) a PSTN call generator means serving a plurality of callers coupled to a PSTN and to a test database;
   (b) an IP client simulator coupled to the test database and an IP Network
   (c) a data bus coupling the PSTN and the IP Network to a (i) registration server for registering an Internet client and (ii) a client Heartbeat server for tracking a system heartbeat message;
   (d) test input data stored in the test database and comprising groups of telephone numbers by ranges and anticipated behavior;
   (e) means for generating a call load for IP subscribers for a representative service, e.g. Interconnect Call Waiting (ICW); and
   (f) an application server for processing test service calls whereby PSTN-IP Network services can be executed for all clients or individual clients as represented by IP Client simulator service test cases verified and validated for all available PSTN services to IP Network clients.

2. The system of claim 1 further comprising:
   (e) means for coupling a plurality of subscribers to the IP Network.

3. The system of claim 1 wherein the call generator means further comprises:
   (g) means for tracking a call flow state model for the clients in the heartbeat server.

4. The system of claim 1 wherein the call generator means further comprises:
   (h) means for generating test case data comprising groups of telephone numbers by ranges and anticipated behavior for post-test processing.

5. The system of claim 1 wherein the client simulator means further comprises:
   (i) client simulator means in the IP network for accepting call load generated by the call generator for subscribers receiving the service.

6. The system of claim 1 wherein the client simulator means further comprises:
   (j) means for tracking a service state model as it relates to subscriber service options and actions.

7. The system of claim 1 further comprising:
   (k) a service control switching point (SCP) coupled to the PSTN; and
   (l) linking means for coupling the SCP to the registration server, the heartbeat server, the application server and the IP network.

8. The system of claim 1 further comprising:
   (m) means coupling the linking means to the PSTN.

9. The system of claim 1 further comprising:
   (n) an element management system coupled to the linking means.

10. The system of claim 1 further comprising:
    (o) a system management system linked to the element management system the SCP and PSTN.

11. In a system for verification and validation of PSTN to IP Network services including a plurality of system components comprising: a PSTN call generator coupled to test data and a PSTN; a Service Control Point coupled to the PSTN and an advanced intelligent network; an IP client simulator coupled to the test data and to an IP network; and a data bus coupling a service registration server; a client heartbeat server; are application server linked to the PSTN and to the IP Network through a security firewall, a method of testing PSTN to IP network services, comprising the steps of:
    (i) Integrating the system components for verification and validation purposes;
    (ii) simulating a plurality of PSTN to IP service subscribers;
    (iii) simulating PSTN service calls to all or individual service subscribers;
    (iv) supporting distinct client service actions;
    (v) providing test automation in support of PSTN to IP service load testing;
    (vi) providing a telephone numbering scheme supporting predictable expected test results when measured from the PSTN call generator; and
    (vii) providing a client behavioral scheme which supports predictable expected test results when measured from the IP client simulator whereby PSTN-IP service cases can be verified and validated for all clients or individual clients as represented by the IP client simulator.

12. A system for verification and validation of PSTN to IP Network services to a plurality of subscribers, comprising:
    (a) a PSTN call generator means serving a plurality of callers coupled to a PSTN and to a test database;
    (b) an IP client simulator coupled to the test database and an IP Network
    (c) a data bus coupling the PSTN and the IP Network to a (i) registration server for registering the ICW client and (ii) a client Heartbeat server for tracking a system heartbeat message;
    (d) test input data stored in the test database and comprising groups of telephone numbers by ranges and anticipated behavior; and
    (e) an application server for processing test service calls whereby PSTN-IP Network services can be executed for all clients or individual clients as represented by IP Client simulator service test cases verified and validated for all available PSTN services to IP Network clients.

13. A system for verification and validation of PSTN to IP Network services to a plurality of subscribers, comprising:
    (a) a PSTN call generator means serving a plurality of callers coupled to a PSTN and to a test database;
    (b) an IP client simulator coupled to the test database and an IP Network
    (c) a data bus coupling the PSTN and the IP Network to a (i) registration server for registering the ICW client and (ii) a client Heartbeat server for tracking a system heartbeat message;
    (d) test scripts for client simulator and call generator operation; and
    (e) an application server for processing test service calls whereby PSTN-IP Network services can be executed for all clients or individual clients as represented by IP Client simulator service test cases verified and validated for all available PSTN services to IP Network clients.

14. A system for verification and validation of PSTN to IP Network services to a plurality of subscribers, comprising:
    (a) a PSTN call generator means serving a plurality of callers coupled to a PSTN and to a test database;

(b) an IP client simulator coupled to the test database and an IP Network (c) a data bus coupling the PSTN and the IP Network to a (i) registration server for registering the ICW client and (ii) a client Heartbeat server for tracking a system heartbeat message;

(d) test logs for storing the results of the test script performance in the system; and (e) an application server for processing test service calls whereby PSTN-IP Network services can be executed for all clients or individual clients as represented by IP Client simulator service test cases verified and validated for all available PSTN services to IP Network clients.

15. A method for verification and validation of PSTN to Internet Protocol (IP) Network services to a plurality of subscribers, prior to the availability of the services, comprising:

(a) serving a plurality of callers coupled to a PSTN and to a test database with a PSTN call generator;

(b) coupling an IP client simulator to the test database and an IP Network;

(c) coupling a data bus to the PSTN and the IP Network to a (i) registration server for registering an Internet client and (ii) a client Heartbeat server for tracking a system heartbeat message;

(d) providing test input data stored in the test database and comprising groups of telephone numbers by ranges and anticipated behavior;

(e) generating test case data comprising groups of telephone numbers by ranges and anticipated behavior for post-test processing; and (f) processing test service calls with an application server whereby PSTN-IP Network services can be executed for all clients or individual clients as represented by IP Client simulator service test cases verified and validated for all available PSTN services to IP Network clients.

16. The method of claim 15 further comprising:

(e) coupling a plurality of subscribers to the IP Network.

17. The method of claim 15 further comprising:

(g) tracking a call flow state model for a client in the heartbeat server.

18. The method of claim 15 further comprising:

(h) generating test case data comprising groups of telephone numbers by ranges and anticipated behavior for post-test processing.

19. The method of claim 15 further comprising:

(i) generating test scripts for the call simulator and call generator.

20. The method of claim 15 further comprising:

(j) generating test logs storing the results of test script performance in the system.

21. The method of claim 15 further comprising:

(k) providing a telephone numbering scheme supporting predictable expected test results when measured from the PSTN call generator.

22. A medium, executable in a computer system for verification and validation of PSTN to Internet Protocol (IP) Network services to a plurality of subscribers, prior to the availability of the services, The medium comprising:

(a) program instruction for a PSTN call generator serving a plurality of callers coupled to a PSTN and to a test database;

(b) program instructions for coupling an IP client simulator to the test database and an IP Network (c) program instructions for coupling a data bus to the PSTN and the IP Network to a (i) registration sever for registering an Internet client and (ii) a client Heartbeat server for tracing a system heartbeat message;

(d) program instructions providing test input data stored in the test database and comprising groups of telephone numbers by ranges and anticipated behavior;

(e) program instructions generating test case data comprising groups of telephone numbers by ranges and anticipated behavior for post-test processing; and (f) program instructions for processing test service calls with an application server whereby PSTN-IP Network services can be executed for all clients or individual clients as represented by IP Client simulator service rest cases verified and validated for all available PSTN services to the IP Network.

* * * * *